June 21, 1966  E. W. GRANT  3,257,606
CONDITION INDICATING MEANS
Filed March 11, 1963
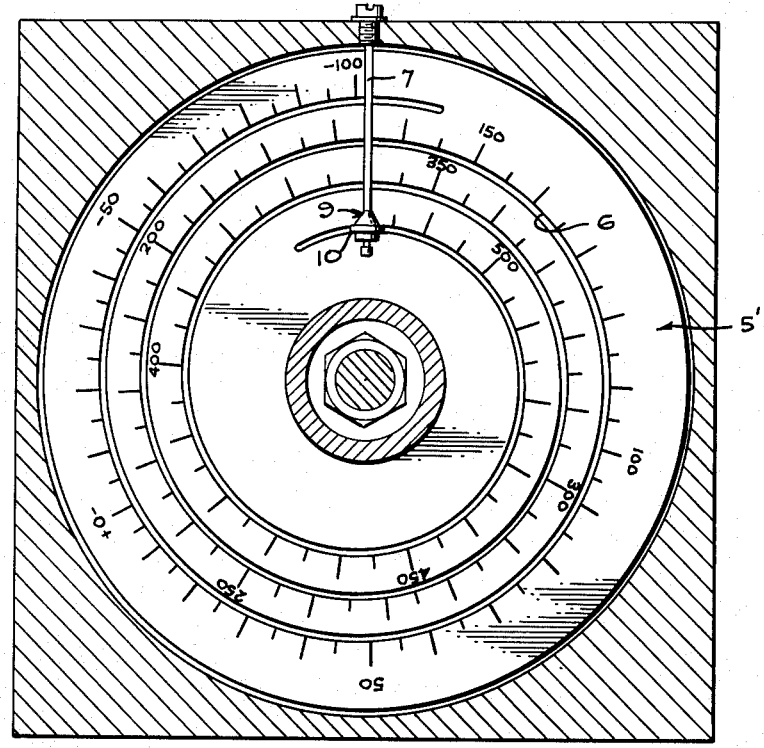
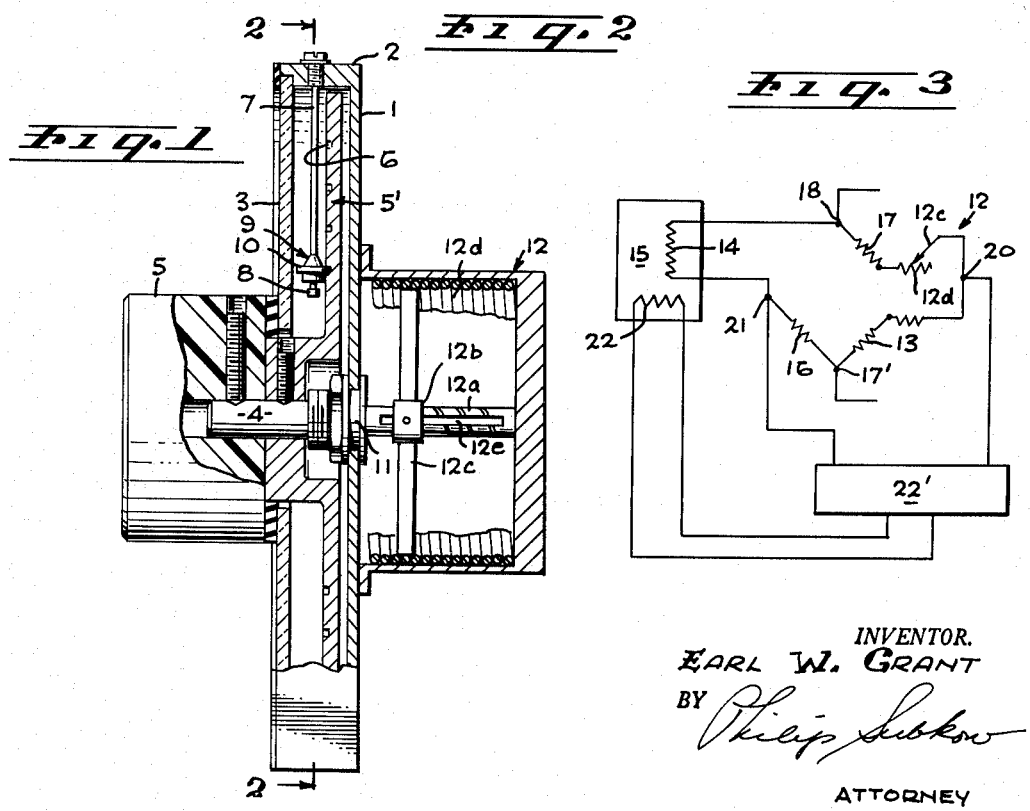
INVENTOR.
EARL W. GRANT
BY
ATTORNEY

United States Patent Office 3,257,606
Patented June 21, 1966

3,257,606
CONDITION INDICATING MEANS
Earl W. Grant, Los Angeles, Calif., assignor to Statham Instruments, Inc., Los Angeles, Calif., a corporation of California
Filed Mar. 11, 1963, Ser. No. 264,415
4 Claims. (Cl. 323—75)

This invention relates to means for indicating the angular displacement of a shaft whereby the degree of angular rotation of more than 360° of the shaft may be displayed, or measured. It is particularly directed to the use of such indicating means in order to display the magnitude of the function whose value varies with the degree of rotation of such shaft. This invention is adapted to temperature-measurement and control devices wherein a temperature-sensitive element whose resistance is a function of temperature, modifies the impedance of one of the arms of a Wheatstone bridge and said bridge is balanced by the introduction of a compensating resistance in an adjacent leg of the Wheatstone bridge to bring the bridge to balance. Alternatively, the bridge may be unbalanced by means of a compensating resistor and the bridge brought to balance by the condition which affects the resistance of the temperature-sensitive element.

Instead of being temperature-sensitive, the resistor may have its resistance varied by any other means, such as by pressure or acceleration, as in the case of accelerometers or pressure gages in which the impedance of a bridge is modified by the condition to be sensed by the transducer. One such application of my invention employs a potentiometer in the leg adjacent to the leg of the Wheatstone bridge which contains the condition-sensitive resistor. The potentiometer contains a resistance element whose resistance is adjusted by rotating a shaft which determines the fraction of potentiometer resistor included in said leg of the Wheatstone bridge. The degree of rotation of the shaft thus indicates the amount of resistance introduced into the adjacent legs for the purposes indicated above.

Alternatively, since the amount of resistance may be related to the magnitude of the condition to be sensed, the angular displacement of the shaft may be employed to indicate the magnitude of the condition sensed by the condition-sensitive resistor in the bridge containing the potentiometer, or the magnitude of the condition which must be attained to bring the bridge to balance or to any specified degree of unbalance.

In the preferred embodiment of my invention, I mount on the shaft a disc arranged perpendicular to the axis of the shaft, containing a spiral groove or channel on the face of the disc. A runner is positioned in said groove and is restrained to move in a line perpendicular to the axis of the shaft, i.e., in a radial direction. The rotation of the shaft will rotate the disc, the runner moves in the groove in a straight line perpendicular to the axis of the shaft. The degree of rotation of the shaft may be determined by the radial position of the runner on the shaft. Thus, the angular displacement of the shaft may be determined by the radial distance of the runner from the shaft center.

Various functional relationships may be obtained by employing various spiral forms. For example, I may use the following forms of all well known spiral geometry. The following gives a relation where "$r$" is the radial distance of the runner and "$a$" is the angular displacement of the shaft measured from any position chosen as zero, taken as a fraction or a multiple of $\pi$, and "$c$" is a constant, depending upon the size of the spiral.

For the spiral of Archimedes, $r=ca$.
For the hyperbolic spiral, $r=c/a$. For the parabolic spiral, $r^2=ca$. For the lituus or trumpet spiral, $r^2=c/a$. For the logarithmic spiral, $a=\log r$. Other forms of spirals may also be employed.

By choosing the form of the spiral, the radial distance may be made to be the desired function of the angular displacement of the shaft within the limits of the spiral geometry. The relationship between the angular displacement of the shaft and the amount of resistance introduced into the Wheatstone bridge circuit by the potentiometer will affect the bridge balance, per angle of displacement of the disc, in any manner as is determined by the potentiometer configuration. In the usual case, for most available commercial potentiometers of the rotary type, this is a linear function. Thus, if the amount of resistance required to balance or to unbalance a bridge is a linear function of the change in condition which varies the resistance of the condition-sensitive resistor of the bridge, an Archimedean spiral will permit the radial distance of the runner and its position along the spiral to be a linear function of the change in the condition, because of the linear variation in the potentiometer resistance. Thus, it will be possible to display upon the spiral equal increments of the change in the condition sensed by the bridge in equi-angular markings. The angular displacement of the disc will be directly proportional to the condition change, and to which the Wheatstone bridge is responsive. Should, however, the variation in the condition require a non-linear variation in potentiometer resistance, another form of spiral, which conforms to the mathematical function relating the change in the potentiometer resistance to the change in condition, may be chosen. The markings on the spiral may again be calibrated to correspond to the variation in resistance required to compensate for the change in condition. The hand of the spiral that is within the angle, that is, whether the angle "$a$" increases in a clockwise direction or counter-clockwise direction will also depend on the polarity of the bridge and the direction in which the potentiometer resistance is to be varied, i.e., to increase or decrease in order to introduce the compensation into the Wheatstone bridge.

It is thus an object of my invention to produce a device which will record and indicate the angular degree of rotation of the shaft by determining the radial distance of the runner in a spiral groove or channel. It is a further object of my invention to produce a device in which the runner is restrained to move along a radial line while remaining in said groove or channel.

It is a further object of my invention to position such a spiral to center at the axis of rotation of a shaft and to connect the shaft to a potentiometer so that the radial position of the runner will indicate the amount of resistance introduced into or removed by the potentiometer from an electrical circuit.

It is a further object of my invention to connect said potentiometer into a Wheatstone bridge circuit so that the radial position of said runner will indicate the degree of unbalance of said Wheatstone bridge or to unbalance the Wheatstone bridge in the desired amount and direction.

It is a further object of my invention to unbalance said bridge responsive to a condition to be sensed so that the position of said runner will be responsive to the degree of said condition required to balance the bridge.

It is a further object of my invention to rebalance the bridge where said bridge has been unbalanced responsive to a condition to be sensed by said bridge, so that the position of said runner will correspond to the degree of said condition.

These and other objects of my invention will be further described by reference to the drawings of which FIGURE 1 is a section through the indicating device of my invention;

FIGURE 2 is a section taken on line 2—2 of FIGURE 1, and

FIGURE 3 is a wiring diagram showing one application of my invention.

The shaft rotation indicator of my invention, as shown in FIGURES 1 and 2, includes a container formed of a back 1, rim 2 and transparent cover 3. Rotatably mounted in the back 1, in a bearing 11, is a shaft 4 which may be rotated by the knob 5, positioned exteriorly of the container. The rotation of the shaft is transmitted to the potentiometer 12 to adjust the potentiometer resistance. Such potentiometers are well known and conventional devices, and any one may be employed. The patented art shows many examples of potentiometers whose resistance may be adjusted by rotating a shaft which extends exteriorly of the potentiometer. The construction of the rotary potentiometer forms no part of my invention. Such a potentiometer is illustrated in FIGURE 1. The shaft may turn a helically grooved shaft 12a on which a nut 12b is mounted. The nut carries a wiper 12c which makes electrical contact with the helical wound resistor 12d. The wiper travels in a track 12e so as to restrain the nut and wiper against rotation. Suitable details of construction as is conventional for potentiometers may be included, as will be understood by those skilled in this art.

Mounted on shaft 4 is the disc 5' carrying a spiral groove 6. The runner 9 is freely, rotatably and slideably mounted on a shaft 7, suspended from the rim 2 in a radial position and carrying a stop 8 at the free end of said rod. The runner 9 has a circular flange 10 which fits into the slot 6. The curvature of the slot and the diameter of the flange 10 are such that the runner may rotate or slide freely in the slot as the disc is rotated by the knob 5.

As illustrated in FIGURE 2, the spiral shown is a clockwise spiral corresponding substantially to the equation of an Archimedes spiral.

As the disc is rotated, the runner travels up and down the rod 7. Index marks on the spiral may correspond to the angular displacement of the shaft from any position arbitrarily chosen as zero due to the equation of the spiral. For example, as shown in the drawing, the Archimedes spiral will permit equal spacings along the spiral for equiangular rotations of the shaft. It may be made to have any other relation as is determined by the geometry of the form of spiral employed.

In FIGURE 3 is shown a temperature-sensitive Wheatstone bridge circuit which may be used with the indicator of my invention to control the temperature in a space 15 which may be heated or cooled. Thus, the potentiometer 12 is connected in series with a resistance 17 forming one arm of a Wheatstone bridge, the adjacent arm 14 being a temperature-sensitive resistor positioned in the space 15. The remaining arms of the bridge are formed by the resistors of 13 and 16. The bridge is powered at the input corners 17' and 18. The output corners are 20 and 21. Any bridge unbalance is applied as a voltage to the conditioning unit 22' which controls the current through the heating coils 22. The design of the controller forms no part of the invention of this application. A suitable form is that shown and claimed in my application, Serial No. 264,414, filed March 11, 1963.

The device of my invention may control the set point, that is, the temperature to be maintained in the space 15. This is done by rotating the disc 51 until the runner has been positioned at the chosen temperature, as indicated by the markings on the face of the dial. This introduces the required amount of resistance from the potentiometer to unbalance the bridge to a degree to cause the bridge to become rebalanced when the resistor 14 is at the selected temperature. If the temperature in space 15 is below the chosen temperature, as indicated on the dial, the bridge is unbalanced in one direction, such as to actuate the unit 22' to pass current through the heating coil 22. This continues until the temperature has risen to change the resistance of 14 sufficient to balance the bridge. When this occurs, the heating current is discontinued.

While I have described particular embodiments of my invention for the purpose of illustration, it should be understood that various modifications and adaptations thereof may be made, within the spirit of my invention, as set forth in the appended claims.

I claim:
1. An angle indicator device comprising a housing, a shaft, means to rotatably mount said shaft in said housing, a disc mounted in said housing and on said shaft, transverse to the axis of said shaft, said disc connected to said shaft for rotation therewith, a spiral groove on the face of said disc, a rod in said housing, one end of said rod fixedly mounted in said housing and extending radially of said disc and spaced from and free of said disc, a runner slideably positioned on said rod and in said groove, said runner moving radially of said disc on said rod and in said groove on rotation of said shaft.

2. The indicator of claim 1, in which said disc is mounted perpendicular to said shaft and said groove is an Archimedes spiral centered on the axis of said shaft.

3. A condition indicator comprising a condition-sensitive Wheatstone bridge, a variable resistance in said bridge, said variable resistance comprising a potentiometer, comprising a fixed resistor and a wiper in contact with said resistor, and means to adjust the resistance of said potentiometer, said means comprising a shaft, means to rotatably mount said shaft and to move said wiper axially of said shaft and over said resistor, a disc mounted on said shaft, transverse to the axis of said shaft, a housing for said shaft and disc, said disc connected to said shaft for rotation therewith, a spiral groove on a face of said disc, a rod in said housing, one end of said rod fixedly mounted in said housing and extending radially of said shaft and spaced from and free of said disc, a runner slideably and rotatably mounted on said rod, said runner slideably positioned in said groove, said runner moving radially on said rod and in said groove on rotation of said shaft.

4. The indicator of claim 3, in which said disc is mounted perpendicular to said shaft and said groove is an Archimedes spiral centered on the axis of said shaft.

References Cited by the Examiner
UNITED STATES PATENTS

| | | | |
|---|---|---|---|
| 1,033,866 | 7/1912 | Blaine | 116—129 |
| 1,685,426 | 9/1928 | Loewe | 116—129 |
| 2,457,165 | 12/1948 | McNamee | 323—75 |
| 2,539,575 | 1/1951 | George | 338—143 |

LLOYD McCOLLUM, *Primary Examiner.*

A. D. PELLINEN, D. L. RAE, *Assistant Examiners.*